United States Patent [19]
Torii

[11] 3,818,296
[45] June 18, 1974

[54] REGENERATIVE BRAKING CONTROL DEVICE FOR AN ELECTRIC CAR

[75] Inventor: Yasunosuke Torii, Tokyo-to, Japan

[73] Assignee: Tokyo Shibaura Electric Company Ltd., Kawasaki-shi, Kanagawa-ken, Japan

[22] Filed: May 19, 1972

[21] Appl. No.: 254,944

[30] Foreign Application Priority Data
May 25, 1971 Japan.............................. 46-35805
May 25, 1971 Japan.............................. 46-35806

[52] U.S. Cl................. 318/247, 318/270, 318/359, 318/376
[51] Int. Cl. ............................................ H02p 5/16
[58] Field of Search .................. 318/268–270, 318/376, 381, 338, 356, 357, 375, 376, 379, 380, 381, 247

[56] References Cited
UNITED STATES PATENTS
2,421,080  5/1947  Newman.............................. 318/247
3,021,465  2/1962  Garten................................ 318/247
3,325,714  6/1967  Torii.................................... 318/376

*Primary Examiner*—Bernard A. Gilheany
*Assistant Examiner*—Thomas Langer
*Attorney, Agent, or Firm*—Oblon, Fisher, Spivak, McClelland & Maier

[57] ABSTRACT

A series D.C. electric motor is employed for the drive of an electric car, the field winding of which is connected in parallel with the armature of the motor while a regenerative brake is being made. The field winding has its excitation controlled by means of a thyristor chopper which is connected in series therewith to hold the regenerative effect both safely and steadily.

3 Claims, 3 Drawing Figures

PATENTED JUN 18 1974　　　　　　　　　　　　　　3,818,296

REGENERATIVE BRAKING CONTROL DEVICE FOR AN ELECTRIC CAR

BACKGROUND OF THE INVENTION

1. Field of the Invention

The present invention generally relates to a regenerative brake control for the driving motors of electric car equipment, such as a train, and more particularly to such a device in which a thyristor chopper or a solid state static switch is employed to adjust the motor current to be fed back from the motor to a d.c. electric supply of the electric car, such as a catenary wire, a third rail, or the like.

2. Description of the Prior Art

Several types of thyristor choppers have been used in the past for regenerative braking control of an electric car. Such thyristor choppers are disclosed, for example, in an "SCR Manual" issued by General Electric Co. in the U.S.A., 3rd Edition, 1964.

A representative prior art powering circuit for driving a car is shown in FIG. 1. A similar prior art circuit for enabling the regenerative braking control of the car is shown in FIG. 2. In actual operation, FIGS. 1 and 2 are derived out of the same circuit, and a conventional sequence control is provided for changing certain connections of the main circuit from that of FIG. 1 to that of FIG. 2. In order to simplify the disclosure, the same is not shown herein, since it is well known in the art.

Referring now to FIG. 1, the prior art powering circuit for an electric car is shown as including four series motors on the car. The armatures $A_1$, $A_2$, $A_3$ and $A_4$ of the four series motors and the corresponding magnetic field windings $F_1$, $F_2$, $F_3$ and $F_4$ are also connected in series. The armatures $A_1$ to $A_4$ and the field windings $F_1$ to $F_4$ are further connected in series between a pantograph PG which functions as a hot terminal for a d.c. voltage supply to the motors, and a ground terminal as shown.

A thyristor chopper CH is shown as being connected between a righthand terminal of the series combination of the armatures, the magnetic field windings and the ground terminal, and the same includes at least two gate control inputs which function as described below.

One of the gate control inputs is connected to a master controller MC for receiving powering control signals therefrom. The powering control signals serve to make the chopper CH turn-on and turn-off in accordance with a predetermined period defined by a speed order signal from the master controller MC. Thus, it is possible to apply a variable voltage and current to the electric motors for controlling the running speed of the electric car.

A current signal is supplied to the other gate control input of the chopper CH in response to the amplitude of the powering current from a d.c. current transformer CT which is provided in the powering circuit such that the on-off cycle of the chopper CH will be changed in response to a variation of the amplitude of the output current of the d.c. current transformer CT. Thus, the amplitude of the motor or current will be held at a predetermined constant value during the powering operation of the electric car.

A reactor L is connected between the pantograph PG and a hot terminal of the armature $A_1$ in order to prevent an abnormal surge voltage from being generated in the main motor circuit each time the chopper periodically turns-on and turns-off. Accordingly, since the level of surge voltage is reduced while the chopper operates, then the withstanding voltage of the chopper can be effectively reduced and thereby enable the whole size of the chopper to be reduced when manufacturing the same.

A flywheel diode DF is provided and connected across the main motor circuit in order to assure a continuous current flow through the main motor circuit during the turn-off of the chopper.

A weak field device FC, which comprises a plurality of shunt resistors FR, a reactor FS connected in series thereto and electromagnetic contactors $FK_1$, $FK_2$ and $FK_3$ is provided for the purpose of a high-speed running operation of the electric car and functions to sequentially remove the resistors in response to a control signal from the master controller MC. The final position of the weak field device is achieved by shunting one of the field windings $F_1$ to $F_4$ by only the shunt reactor FS, and thus the electric car will be able to run at its maximum running speed.

When a regenerative brake is intended for either a slowing down of the speed of the car or a speed suppression such as when the car is running down on an inclined railway, the main motor circuit is changed from that of FIG. 1 to that of FIG. 2 due to an order signal conducted from the master controller MC.

In this case, the chopper CH is connected in parallel with the main motor circuit, which serially includes both the armature and field windings as shown. Although this is easily provided by changing the connections of the electromagnetic contactors from one position to another, it should be understood that for purposes of simplication this has not been shown in the Drawings, since the same is conventional and well known in the art. Also, it should be understood that the exciting polarity of the magnetic fields is reversed from that of FIG. 1 to that of FIG. 2.

Thus, if the electric car is running at a speed sufficient after the powering operation has been terminated, to cause the motors to function as generators, then it will be possible to effectively carry out the regenerative braking function for the electric car.

At the first regenerative brake, the diode DF is altered in position from that of FIG. 1 to that of FIG. 2 in order to avoid an inversed current which flows from the catenary wire back to the main motor circuit. The chopper CH will then start its d.c. chopping operation under the control of the master controller MC.

It should be understood that a substantial residual magnetism remains in the magnetic field structures $F_1$ to $F_4$ as a result of the excitation from a prior powering operation. Because of such residual magnetism, the motors will operate as generators, and as a result thereof, the generator current or braking current will flow first through the chopper.

The generator voltage will then be established to a level sufficient to cause the regenerative function on the driving motors. But, as described below, it should be understood that in the past the induced voltage of the electric motors was selected at a level of about 80% of the catenary voltage. This was because, if the motor voltage during the regeneration was increased so as to exceed the catenary voltage level, then the regenerative control that used the chopper CH would fail to continue its chopping operation.

When the chopper is turned on at the start of a regenerative brake, then a small dynamic brake current will be established through a closed circuit which includes the main motor circuit and the chopper therein. Thus, the dynamic brake current will be gradually increased until the same reaches a predetermined maximum amplitude which is determined in accordance with a predetermined maximum signal which comes from the current transformer CT and is applied to the chopper gate.

When the dynamic brake current is built up to a sufficient level to stop the chopper operation, then the chopper current will be suddenly turned off. As the current flowing through the main motor is thus chopped off or suddenly cut off, a relatively high voltage, which mainly results from the self inductance of the reactor L, will occur and accordingly, the induced voltage of the reactor L will be added to the induced voltage of the motors. Thus, it is seen that the entire voltage in the main motor circuit will be equal to or exceed the catenary voltage. A current will then start to flow back to the catenary for the start of a regenerative braking of the car. The regenerative brake effect will thus continue until the regenerative brake current is damped to a lower predetermined amplitude which is substantially defined by the $L\,(di/dt)$ of the reactor L.

When the regenerative brake current is reduced by the damping function, due to the reactor L, and stopped, then the diode DF will block any backing current which may happen to flow from the catenary back to the main motors, and again the control signal from the current transformer CT will cause the chopper CH to start to turn-on. In this way, the regenerative effect will be continued until the total of the motor voltages and the reactor voltage will be lower than the catenary voltage so that it will be impossible to obtain a substantial regeneration.

It will be understood that the weak field device is employed for the weak field control of the field windings $F_1$ to $F_4$, while the electric car is running at a relatively high speed. At the relatively high speed, a still higher induced voltage than the catenary voltage over the main motor circuit may exist, and the same may result in a regenerative brake effect with even less stability than described hereinabove.

While somewhat satisfactory, with the above-described prior art device for the regenerative brake control of an electric car, since the electric motors are used as series motors, the braking effect or regenerative braking current is greatly varied due to the speed variation of the car, and accordingly the brake characteristics are extremely unstable.

In addition to the above defect, with the regenerative brake control device of the prior art it is required that the motor induce its voltage to only about 80 percent of the rated voltage during the regeneration thereof. Accordingly, it is impossible to effectively use the electric motors, and accordingly the braking force may fall to an unpreferably small value.

SUMMARY OF THE INVENTION

Accordingly, it is an object of the present invention to provide a new and improved unique regenerative brake control for the electric motors that drive an electric car in which a d.c. chopper is employed for adjusting the level of electric current flowing through the electric running motors thereof during either powering or braking thereof.

Another object of the present invention is to provide a new and improved unique regenerative control for an electric car in which a d.c. thyristor chopper is used to control the weak field control thereof for the d.c. series type driving motors of the electric car, and which is particularly adapted for the weak field control of the d.c. series motors of the electric car without the need for using a variable resistor with change-over electromagnetic contactors connected in parallel therewith.

A further object of the present invention is to provide a new and improved unique regenerative control in which the full rated voltage to be induced in the electric motor during the regenerative braking thereof is effectively employed for enabling a high rate of regeneration of the electric car.

Yet one other object of the present invention is the provision of a regenerative control for an electric car which operates smoothly and is highly stable.

Yet still another object of the present invention is the provision of a regenerative brake control for an electric car wherein the d.c. driving motors thereof operates as a d.c. shunt generator during regeneration and operate as a d.c. series motor during a powering operation.

In accordance with a preferred embodiment of the present invention, the foregoing and other objects are, in one aspect, attained by the provision of at least one d.c. series motor for running and braking an electric car equipment. The d.c. series motor includes an armature and at least one series field winding for the d.c. excitation thereof. The series field winding of the electric motor is connected in parallel with the armature, while a regenerative brake is applied to the motor. A solid state chopper unit, such as of the thyristor type, is also connected in series with the field winding while the regenerative braking is being carried out. The electric motor is thereby run as a d.c. shunt generator when the regenerative braking is effective, and accordingly the electric current flowing through the field winding is controlled by the chopper independently of the armature current.

BRIEF DESCRIPTION OF THE DRAWINGS

Various other objects and many of the attendant advantages of this invention will be readily appreciated as the same becomes better understood by reference to the following detailed description when considered in connection with the accompanying drawings, in which like reference numerals designate the same or similar parts throughout the Figures thereof, and wherein.

DETAILED DESCRIPTION OF THE PREFERRED EMBODIMENTS

Figure 1:
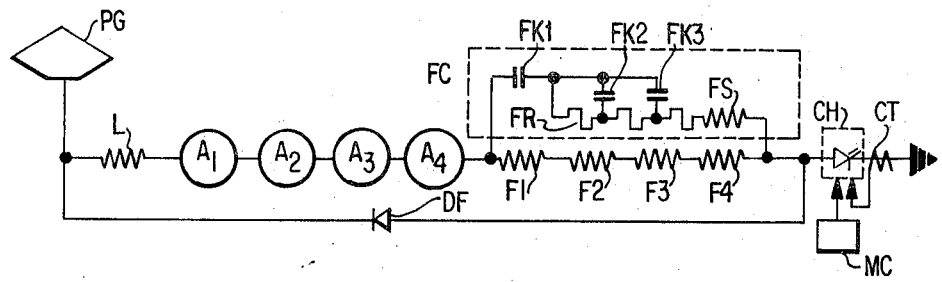
FIG. 1 is a schematic diagram of a prior art powering circuit for an electric car.
Figure 2:
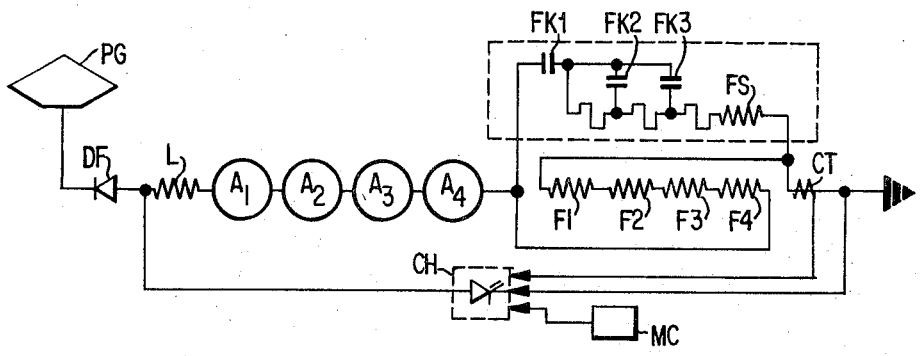
FIG. 2 is a schematic diagram of a prior art regenerative brake circuit for an electric car.
Figure 3:
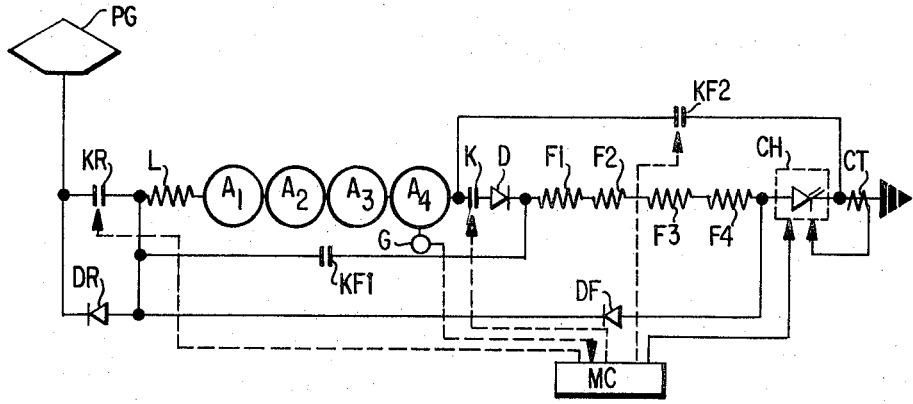
FIG. 3 is a main motor circuit diagram of a preferred embodiment of this invention.

Referring now to FIG. 3, wherein like parts are designated by the same numerals as those of FIGS. 1 and 2, the main motor circuit of a regenerative brake control for an electric car, such as a train, in accordance with the present invention is shown as including several electromagnetic contactors KR, K, $KF_1$ and $KF_2$ in order to change the operative connections of the main motor circuit from a powering connection to a regenerative one. Two diodes D and DR are provided in addition to the flywheel diode DF of FIGS. 1 and 2. It should be understood that the contactors K, KR, $KF_1$ and $KF_2$ will change their position in a predetermined sequence in response to the control signals from the master controller MC.

It should further be understood that the contactor $KF_2$ is connected across the series combination of the contactor K, the diode D, the field windings $F_1$ to $F_4$ and the chopper CH. The chopper CH is also controlled by signals from the master controller MC and a d.c. current transformer CT.

Let it be assumed that it is required or desired to make a powering or running operation of the electric car. Initially, only the two contactors KR and K are closed under a control order from the master controller MC. A gating pulse is then sent to the gate control circuit of the chopper CH to force it to turn-on and off. It should now be apparent that the circuit is now made ready for the provision of a power or running operation of the electric car associated therewith and that the same includes the same connections as described in FIG. 1.

The car can thus run at a speed which has been defined by the chopping frequency of the chopper CH. The chopping frequency is also conventionally defined by variable control positions of the master controller MC and can be further adjusted by the current signal from the current transformer CT.

The forced excitation, namely, the excitation without using the weak field device, has been described above as using a series motor.

Now, if it is desired to apply the weak field control of the series motors for the provision of a higher speed running, then the control signals from the master controller MC will force the contactor $KF_2$ to close, to thereby directly ground the righthand terminal of the armature $A_4$ to thereby open the contactor K, and to close the contactor $KF_1$. During the change in the above connections, the diode D will function as a blocking diode to prevent the armatures $A_1$ to $A_4$ from short-circuiting thereacross.

From the above, it is seen that the field windings $F_1$ to $F_4$ are in series with the chopper and that the combination thereof are connected in parallel with the armatures $A_1$ to $A_4$. Accordingly, all of the motors will now function as a shunt motor.

In accordance with the above, the chopper CH can therefore make a weak field control of the shunt field current independently of the armature current. The chopping frequency of the chopper CH is controlled only by the output signal from the d.c. current transformer CT.

When it is desired to apply a regenerative brake to the electric car, then the master controller will alter its control position to thereby open the contact KR.

It should be understood that all of the motors can now operate as shunt generators with a self-excitation as the shunt fields $F_1$ to $F_4$ are applied excitation from their respective armature terminals. Accordingly, the shunt field excitation of the motors can be made independently of the armature current, and as a result thereof, the regenerative brake control of the electric car can be achieved safely and steadily.

The function of the chopper CH is similar to that of FIGS. 1 and 2, except for the fact that the chopper controls the shunt field current in order to maintain the amplitude of the armature current at a relatively constant value or limiting value as defined by the rating of the motors.

From the above, in accordance with the present embodiment, it is seen that since the motors function as shunt generators during a regenerative brake and since the shunt field windings thereof are excited from the armature terminals independently of the armature current, that even though there may be a variation of armature current as a result of a car speed variation, the armature current variation will not affect the shunt field excitation. Thus, it is possible to apply the regenerative brake safely and steadily on the electric car so that a maximum brake torque can be obtained by employing the maximum rated armature current. In this way, since it is possible to use the maximum rated armature current for the regenerative brake of the electric car, the brake effect is utilized to the maximum extent possible, thereby enabling economical use of the main motors. In addition to the above, several electromagnetic contactors for the weak field control, which are employed during both powering and braking operations when the car speed is extremely high, can be eliminated. Moreover, since it is possible to use a higher generated voltage of the motor during a regenerative brake, it will be apparent that the feedback of the electric power from the motors to the catenary will be made easily and inexpensively without the use of the reactor L which has a large inductance and size thereof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A regenerative brake control system of the electric motors for driving an electric car which comprises;
    at least one d.c. electric motor for driving said electric car, said motor including an armature and at least one set of magnetic field windings for enabling excitation of said armature and functioning as a generator to return an electric power generator thereby when it is desired to brake said car;
    a solid state chopper connected in a main circuit which includes said d.c. electric motor therein, said chopper being adapted to adjust a powering and braking current of said motor to a predetermined level; and,
    means for changing connections of said chopper, motor armature and field windings in response to the manner of operation of said car,
    said d.c. electric motor being operated as a series field motor when a powering operation is desired to drive said car, and said d.c. electric motor being operated as a shunt field generator when a regenerative operation is desired for braking said car,
    said chopper being connected in series with said armature and said field windings while said car is making a powering operation, and said chopper being connected in series with said field windings, said series connection of said chopper at said field windings being interconnected and parallel with said armature when a regenerative braking operation for the electric car is desired, whereby the shunt field excitation of said motor is independent of said armature current during said regenerative braking operation, and wherein said chopper is connected in series with the field windings and said series connection of said chopper and said field windings in turn are connected in parallel with said armature to provide a weak field control while said car is powered at a high speed, said d.c. motor being operated as a shunt motor during said weak field control, whereby said chopper controls the shunt field current independently of the armature current during said weak field control.

2. A regenerative brake control system of electric motors for driving an electric car according to claim 1, wherein said electric motor comprises a self-excited shunt field generator while the regenerative braking of said d.c. electric motor is taking place.

3. A regenerative brake control of electric motors for driving an electric car according to claim 1, wherein said solid state chopper is of the thyristor type.

* * * * *